J. H. GEDNEY.
POTATO-DIGGER.

No. 174,359. Patented March 7, 1876.

Witnesses:
Henry Eichling
Fred C. Bond

Inventor:
Jonathan H. Gedney
By B. C. Clark
his atty.

UNITED STATES PATENT OFFICE.

JONATHAN H. GEDNEY, OF RYE, NEW YORK.

IMPROVEMENT IN POTATO-DIGGERS.

Specification forming part of Letters Patent No. 174,359, dated March 7, 1876; application filed November 27, 1875.

*To all whom it may concern:*

Be it known that I, JONATHAN H. GEDNEY, of the town of Rye, in the county of Westchester, State of New York, have invented an Improved Plow for Digging Potatoes, which I call "My Potato-Digger," of which the following is a specification, reference being had to the accompanying drawings, forming part of the same, in which—

Figure 1:
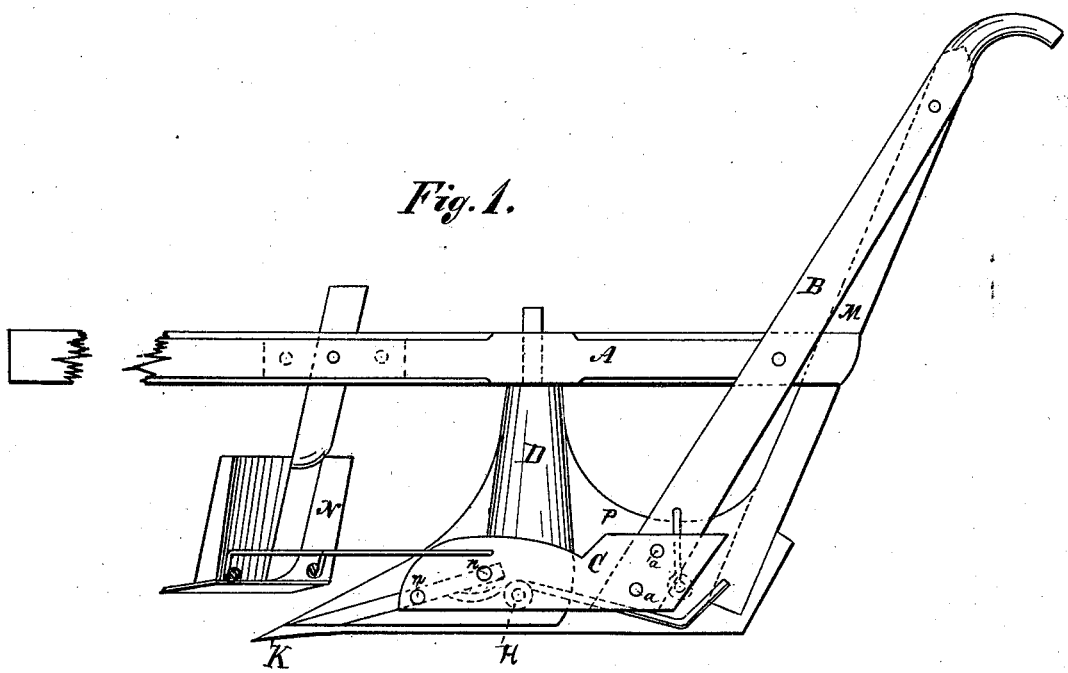
Figure 2:
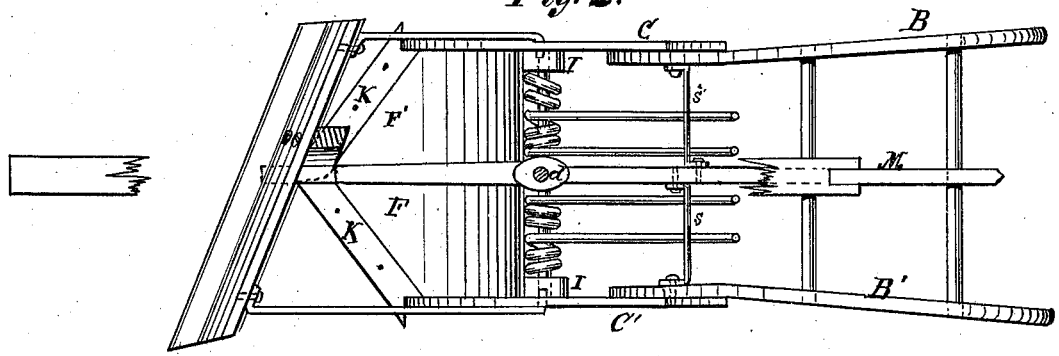

Figure 1 represents a side view of my machine; Fig. 2, a perspective or plan view; and Fig. 3, a bottom view, showing the position of the wire fingers or separators in relation to the mold-board, as hereinafter more particularly described.

My invention relates to a plow so constructed and arranged that potatoes may be uncovered or dug up, and, with the soil, passed over the mold-boards to the rear onto the wire fingers or separators, and thence scrabbled to the top, separated, and left lying on the surface.

Figure 3:
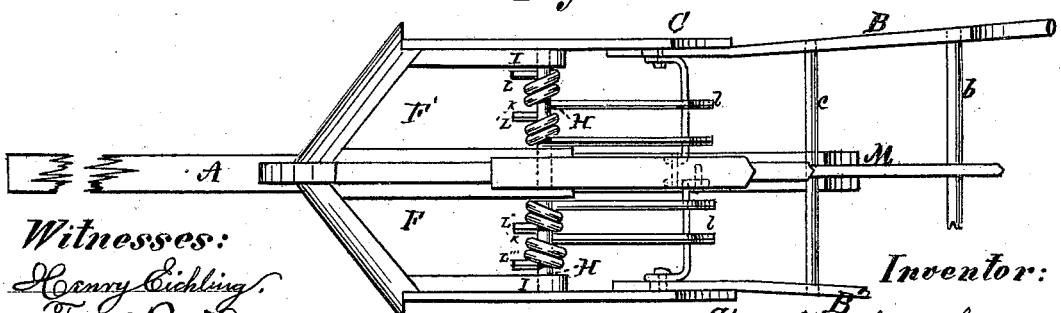

In the drawings, Fig. 1, A represents the beam, usually made of wood or iron, supported on one end of the sheath or standard D, the opposite end of said standard being fastened to, or, usually, cast with, a double mold-board, one on each side of the standard, and having a straight flat piece, P, in Fig. 1, projecting out to the rear of the plow, to which is fastened an upright piece, M, which piece, passing through, and fastened to, one end of the beam A, serves to strengthen the beam and piece M and render them more firm. B B' are the handles or stilts, held in place by fastening the lower ends into the side-boards (more particularly described hereafter) C C', and held together at the center and top by means of the round c, which passes through the upright M, and is fastened to the handles at each end also by another round, b, similarly fastened, as shown. F F are two mold-boards, preferably cast with, or fastened on each side of, the standard D, having plane surfaces, and given such a pitch or angle as to give each a rise or angle not exceeding in a working model three or three and a half or four inches. If set at a greater pitch the soil is apt to fall back, instead of passing over and off the mold-boards, especially in heavy soil. C C' are side boards or guards, of necessary width, one end of which is fastened on and to the side of the mold-board by means of the bolts $n$ $n'$, and the other to the lower end of the handle or stilt B by means of the bolts $a$ $a'$, said bolts having sunken heads. These sides or guards C C' act as a guard to prevent the soil and potatoes from falling off of the side of or from the mold-boards, so that both pass over onto the wire fingers, hereinafter described. $s$ $s'$ are two iron braces, one, as shown in Figs. 2 and 3, $s$, extending from the side-board C, where the side-board is fastened or joined to the handle B to the center piece P, and the other, $s'$, extending from the junction of the side-board C' and handle B' to the piece P, thus serving the purpose of strengthening the handles and side-boards at their junction and the center piece P. L L' L'' L''' are wire fingers, or, as I call them, "separators," made in a working model of wire about five-eighths of an inch thick, arranged as shown in the drawing, where I have shown but four, two on each side, lest it confuse the view; but more can be used if necessary. These separators are wound loosely around the iron bars or rods H H, one end of which rods are set in the sheath or standard, one on each side, and the other ends rest in, or are set in, the bearings or pieces I I. These pieces or bearings I I may be cast separate, and bolted on the under side of the mold-boards, as shown, or cast as one piece with the mold-boards. One end of these fingers L, as $k$, extends under and rests against the under or lower side of the mold-boards, the other end, $l$, projecting out in the opposite direction for any desired distance, yet not far enough to be in the way of the person holding the plow, and bent up at any required angle or bend, as shown in Fig. 1. These fingers should be wound very loosely on the rods H H, so as to allow great motion or play up and down. The end $k$, being under and resting against the under side of the mold-boards when the end $l$ is depressed by the weight of any substance passing from the mold-board onto the fingers, prevents too great depression of the end $l$, and as the plow is dragged along over the ground the soil and tubers, passing over the mold-boards onto these fingers or separators, which are kept in motion by the movement of the plow, are shaken apart, and the potatoes are scrabbled to the top and left lying on the surface. K is a double share, with point, fastened to the front end of the double mold-boards by sunken bolts, in the usual way of fastening shares to mold-boards. (Not shown in the drawing.)

I have represented in the drawings a cutter, N, placed on the beam at an angle of forty-five degrees, projecting down over the share, for the purpose of cutting down the vines or weeds; but a four-tongued fork may be used instead, to remove the vines, &c., or both may be dispensed with, when desired.

In the operation of my machine, it will be seen that as the share passes below the tubers and the soil, both will be thrown onto the mold-boards, and thence pushed off onto the fingers L, the guard or side boards C C' preventing both from falling off at the sides, and the said fingers being loosely wound around the bars H H, all the motion of the plow is communicated to them, giving them a lateral motion—may be very slight—and a motion up and down, thus separating the soil and potatoes, leaving the potatoes scrabbled to the top, and allowing all weeds, &c., to pass off.

Instead of the moving fingers, stationary teeth may be cast with the double mold-boards, and the motion of the plow shake off the soil and potatoes; but I do not claim such a combination here, reserving the right to make application hereafter for such.

What I claim as my invention, and desire to secure by Letters Patent, is—

In a potato-digger, the vine-clearer N, the double mold-boards F F, the guards C C', the independently-pivoted wire fingers or separators I I', constructed, combined, and operating substantially as shown and described.

Witness my hand this 23d day of November, 1875.

JONATHAN H. GEDNEY.

Witnesses:
B. S. CLARK,
H. INFELD.